United States Patent [19]

Brett et al.

[11] Patent Number: 5,066,030
[45] Date of Patent: Nov. 19, 1991

[54] CUSHIONED WHEEL ASSEMBLY FOR A SPRAYER

[75] Inventors: William A. Brett; Richard D. Zaun, both of Des Moines, Iowa

[73] Assignee: Deere & Company, Moline, Ill.

[21] Appl. No.: 607,013

[22] Filed: Oct. 30, 1990

[51] Int. Cl.⁵ .............................................. B60G 7/00
[52] U.S. Cl. ...................................... 280/92; 280/696; 180/215; 267/221
[58] Field of Search ............... 280/92, 690, 691–694, 280/696; 180/215, 210; 267/221

[56] References Cited

U.S. PATENT DOCUMENTS

| | | | |
|---|---|---|---|
| 2,639,165 | 5/1953 | Winters | 267/221 |
| 2,869,665 | 1/1959 | Beck | 280/92 |
| 4,353,567 | 10/1982 | Weldy | 280/92 |
| 4,690,427 | 9/1987 | Raidel, Jr. | 280/694 |

*Primary Examiner*—Joseph F. Peters, Jr.
*Assistant Examiner*—R. B. Johnson

[57] ABSTRACT

A very compact and cushioned narrow front assembly for a high crop spray vehicle. A U-shaped and generally horizontal pivoting frame is connected to the lower end of a steering yoke for rocking about a first axis. A ground wheel is carried on the side legs of the U-shaped frame for rotation about a second axis offset in the rearward direction slightly from the first axis. A pair of shock absorbers extend downwardly from the upper portion of the steering yoke to pivotal connections with each of the side legs just behind and above the second axis. The forward ends of the side legs, which terminate rearwardly of the forwardmost extremity of the ground wheel, are each pivotally connected to the eye-end of a tension link which extends upwardly through a spring abutment bracket fixed to the lower end of the corresponding side of the yoke. A spring is compressed between the upper end of each of the links and the corresponding spring abutment bracket to provide balanced shock-absorbed cushioning.

10 Claims, 2 Drawing Sheets

CUSHIONED WHEEL ASSEMBLY FOR A SPRAYER

BACKGROUND OF THE INVENTION

1) Field of the Invention

The present invention relates generally to high clearance crop sprayers, and more specifically to a narrow steerable front wheel assembly for such a vehicle.

2) Related Art

High clearance crop sprayers such as the John Deere Model 6000 Hi-Cycle typically have a frame supported a substantial distance above the ground by a single steerable front wheel located on the centerline of the vehicle and two rear wheels transversely spaced on opposite sides of the centerline. The wheels must be narrow to run between rows of crops and to avoid crop damage even in narrowly spaced rows of mature plants. In rough ground conditions, the sprayer is subjected to a considerable amount of bumping and vibration which results in extra fatigue for the operator and added wear and tear on the vehicle and the sprayer components. To reduce the impact of the ground conditions, the operator must slow the vehicle to a speed under the normal operating speed which results in lost productivity.

Some sprayers such as the Melroe Spra-Coup include a cushion narrow front to smooth the ride and lessen impact loading on rough ground surfaces. A single shock absorber is supported above the wheel with a large cushion spring encircling the shock absorber. A relatively massive yoke assembly extends upwardly adjacent the steering yoke to a connection with the lower ends of the spring and shock absorber. A substantial amount of space between the top of the wheel and the underside of the vehicle frame is required to accommodate the cushion front.

BRIEF SUMMARY OF THE INVENTION

It is therefore an object of the present invention to provide an improved cushion front wheel assembly for a vehicle such as a high clearance sprayer. It is another object to provide such a wheel assembly which is more compact, more attractive and more functional than at least most previously available front wheel assemblies.

It is another object of the present invention to provide an improved steerable cushion front wheel assembly for a sprayer vehicle which provides increased productivity and reduced operator fatigue and is more compact and requires less under frame clearance than most previously available cushion front wheel assemblies. It is still a further object of the present invention to provide such an assembly which has an improved component geometry for better function and sturdy support without massive or excessively high support components.

A very compact and cushioned narrow front assembly for a high crop spray vehicle is provided having a U-shaped and generally horizontal pivoting frame connected to the lower end of a steering yoke for rocking about a first horizontal axis. A ground wheel is carried on the side legs of the U-shaped frame for rotation about a second axis offset in the rearward direction slightly from the first axis. A pair of shock absorbers extend downwardly from the upper portion of the steering yoke to pivotal connections with each of the side legs just behind and above the second axis. The forward ends of the side legs, which terminate rearwardly of the forwardmost extremity of the ground wheel, are each pivotally connected to the eye-end of a tension link which extends upwardly through a spring abutment bracket fixed to the lower end of the corresponding side of the yoke. A spring is compressed between the upper end of each of the links and the corresponding spring abutment bracket to provide balanced shock-absorbed cushioning without requiring additional under frame clearance. Width requirements are also relatively small so that plant damage in mature or narrow row crops is minimized. The location of the components including the shock absorber and spring arrangement provides a sturdy yet compact package which functions to cushion and absorb shocks as well as or better than much more massive arrangements, even under heavy loads.

These and other objects, features and advantages of the present invention will become apparent to one skilled in the art upon reading the following detailed description in view of the drawings.

DETAILED DESCRIPTION OF THE DRAWINGS

Figure 1:
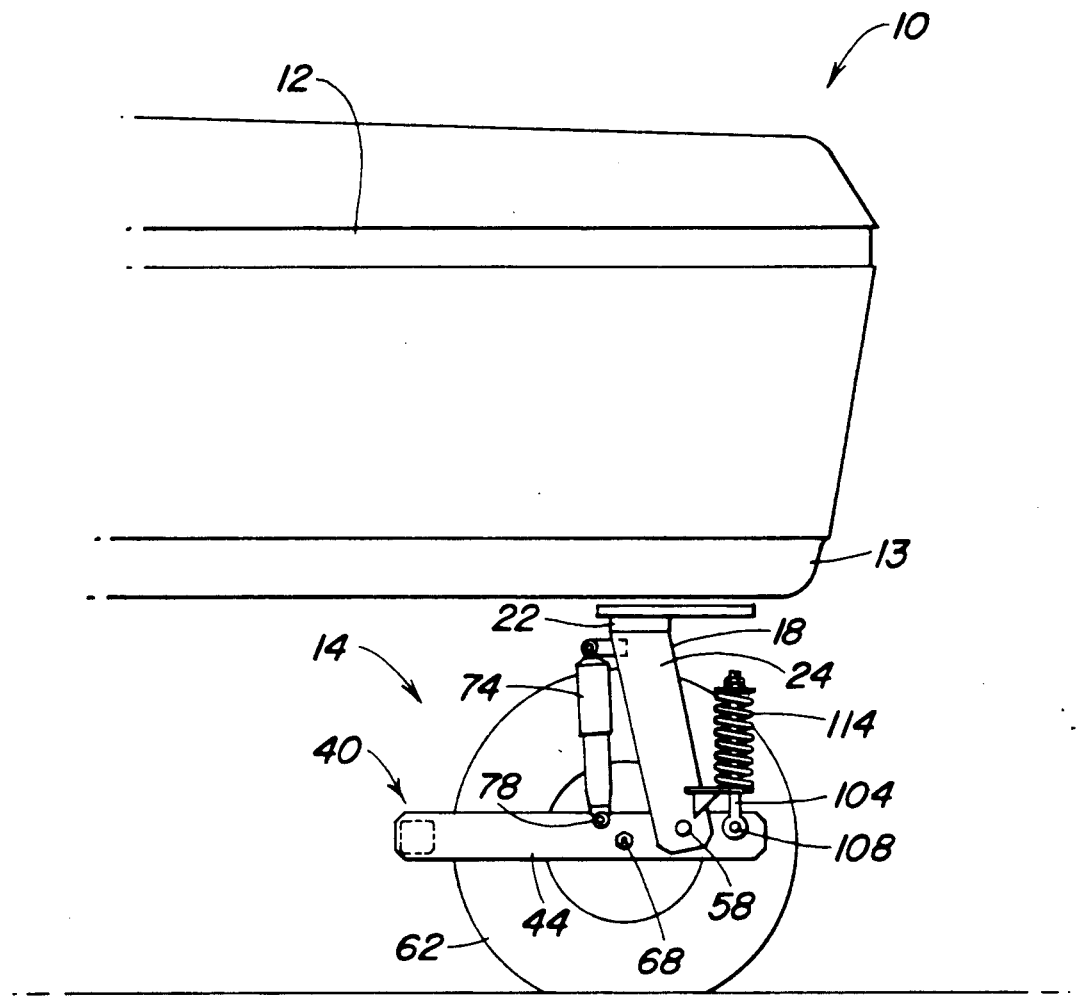
FIG. 1 is a side view of a forward portion of an agricultural sprayer with the wheel assembly of the present invention.

Referring now to FIG. 1, therein is shown the forward portion of an agricultural sprayer 10 having a main frame 12 with lower engine side support rails or subframe 13 supported for forward movement over the ground by a forward steerable wheel assembly 14 and by rear drive wheels (not shown). The frame is offset above the ground a sufficient distance to allow the sprayer 10 to be operated in mature row crops without damage to the plants.

The wheel assembly 14 includes a steering yoke or weldment 18 having an upper cross member 22 which is fixed to an upright rotatable shaft (not shown) operably connected to the steering wheel in the sprayer cab. Upright side plates 24 and 26 are welded to the ends of the cross member 22 and extend downwardly and slightly forwardly therefrom to lower ends 34 and 36. A U-shaped and generally horizontal pivoting frame 40 having side legs 44 and 46 and a connecting portion 48 extending between the side legs is pivotally connected near the forward ends of the side legs by bolts 54 and 56 to the respective lower ends 34 and 36 for rocking about a generally horizontal axis 58 defined by the bolt axes. The U-shaped frame 40 opens forwardly and provides an accommodation space 60 for receiving a ground wheel 62. An axle 66 supports the wheel 62 between the side legs 44 and 46 for rotation about an axis 68 (FIG. 2) located rearwardly and slightly below the axis 58. The connecting portion 48 extends rearwardly of the aftmost portion of the wheel 62 and supports an adjustable mud scraper 72.

Shock absorbers 74 and 76 have their lower ends pivotally connected to the to the side legs 44 and 46, respectively, for rocking about a transverse axis 78 located rearwardly and above the rotational axis 68 of the wheel 62. The shock absorbers 74 and 76 extend upwardly from the axis 78 to pivotal connections with brackets 84 and 86 which project rearwardly from the inner surfaces of the side plates 24 and 26 just above the upper extremity of the wheel 62.

Figures 2, 3:
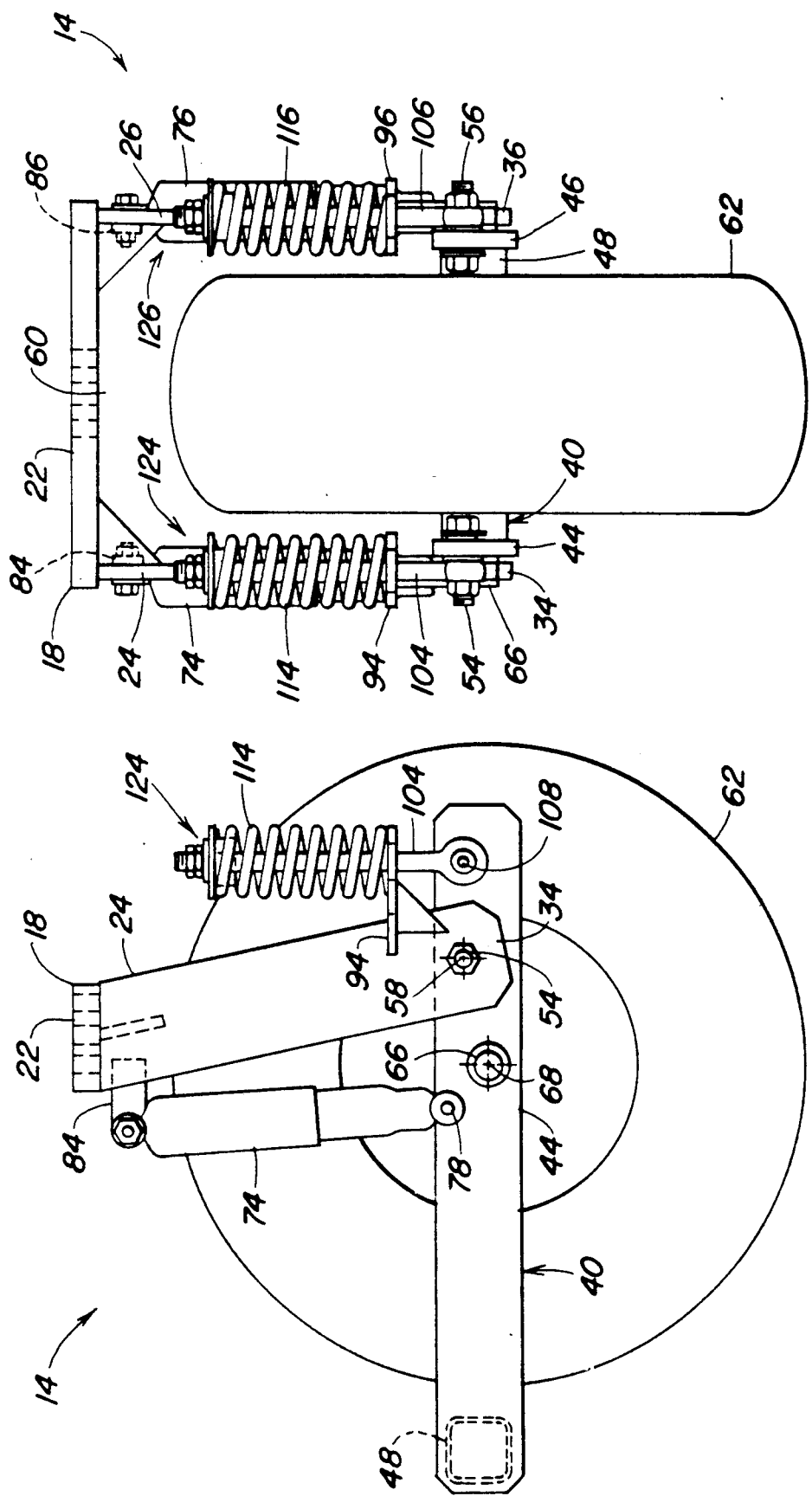
FIG. 2 is an enlarged side view of the wheel assembly shown in FIG. 1.
FIG. 3 is a front view of the wheel assembly of FIG. 2.

First and second horizontal spring abutment brackets 94 and 96 are fixed to the lower ends of the side plates 24 and 26 on opposite sides of the wheel 62 and project forwardly to locations above the forward ends of the side legs 44 and 46, rearwardly of the forwardmost extremity of the wheel 62 (FIG. 2). First and second tension links 104 and 106 have lower eye-ends connected to the side legs 44 and 46 for pivoting about an axis 108 located forwardly of the axis 58. The tension links 104 and 106 extend upwardly through apertures in the corresponding spring abutment brackets 94 and 96 and terminate in upper threaded ends. Springs 114 and 16 are adjustably compressed between the upper surfaces of the spring abutment brackets 94 and 96 and nut and washer assemblies 124 and 126 threaded onto the upper ends of the links 104 and 106. As best seen in FIG. 2, the springs 114 and 116, as well as the shock absorbers 74 and 76, are substantially contained within a boundary defined by an imaginary cylinder having an axis corresponding to the rotational axis 68 of the wheel 62 and having a diameter approximately equal to the diameter of the wheel to provide a compact package of components which require minimal space below the frame 12.

Under the influence of the weight of the sprayer 10, the U-shaped frame 40 pivots in the clockwise direction (FIGS. 1 and 2) about the axis 58 to draw the tension links 104 and 106 downwardly until the spring force acting upwardly on the forward end of the frame balances the clockwise moment. The dual shock absorber and spring configuration achieves balanced shock absorbed cushioning with relatively small springs, even under heavy loads.

Having described the preferred embodiment, it will become apparent that various modifications can be made without departing from the scope of the invention as defined in the accompanying claims.

We claim:

1. In a high crop spray vehicle having a vehicle frame adapted for forward movement over a field, an upright steering yoke supported from the vehicle frame and extending downwardly therefrom, a U-shaped and generally horizontal pivoting frame having side legs and a connecting portion extending between the side legs, means for rockably connecting the pivoting side legs to the lower end of the steering yoke for rocking of the pivoting frame about a first axis, a ground wheel carried between the side legs of the U-shaped frame for rotation about a rotational axis offset in a first fore-and-aft direction from the first axis, first and second shock absorbers extending downwardly from the upper end of the steering yoke to pivotal connections with each of the side legs at locations offset in the fore-and-aft direction from the rotational axis, first and second spring abutment brackets fixed to the lower end of the steering yoke on opposite sides of the wheel, first and second tension links connected to the side legs on the fore-and-aft side of the first axis opposite that of the rotational axis, the tension links extending upwardly through the spring abutment bracket on the corresponding side of the yoke, and a spring compressed between the upper end of each of the links and the corresponding spring abutment bracket to thereby provide shock-absorbed cushioning for the wheel.

2. The invention as set forth in claim 1 wherein the ends of the side legs opposite the connecting portion terminate inwardly of the corresponding fore-and-aft extremity of the ground wheel.

3. The invention as set forth in claim 2 wherein the tension links are pivotally connected to said ends of the side legs.

4. The invention as set forth in claim 2 wherein substantially all of the compression springs are contained within a boundary defined by an imaginary cylinder having an axis corresponding to the rotational axis of the wheel and a diameter approximately equal to the diameter of the wheel.

5. The invention as set forth in claim 4 wherein substantially all of the shock absorbers are also contained within the boundary of the imaginary cylinder.

6. In a high crop spray vehicle having a vehicle frame adapted for forward movement over a field, an upright steering yoke supported from the vehicle frame and having first and second side plates extending downwardly therefrom, a U-shaped and generally horizontal pivoting frame having first and second transversely spaced side legs and a connecting portion extending between the side legs, means for rockably connecting the first and second side legs to the lower ends of the corresponding first and second side plates for rocking of the pivoting frame about a first horizontal axis, a ground wheel supported by the side legs of the U-shaped frame for rotation between the side legs and the side plates about a horizontal rotational axis offset rearwardly from the first axis, first and second shock absorbers extending downwardly from the upper end of the steering yoke to pivotal connections with the respective first and second side legs at locations offset in the fore-and-aft direction from the first axis, first and second spring abutment brackets fixed to the respective first and second side plates on opposite sides of the wheel, first and second spring supports connected to the side legs at locations offset from the first axis, the tension links extending upwardly through the spring abutment bracket on the corresponding side of the yoke, first and second wheel cushioning springs, and means for supporting the springs from the respective first and second spring supports and brackets to thereby provide shock-absorbed cushioning for the wheel.

7. The invention as set forth in claim 6 wherein the ends of the side legs opposite the connecting portion terminate inwardly of the corresponding fore-and-aft extremity of the ground wheel.

8. The invention as set forth in claim 7 wherein the tension spring supports are pivotally connected to said ends of the side legs.

9. The invention as set forth in claim 7 wherein substantially all of the compression springs are contained within a boundary defined by an imaginary cylinder having an axis corresponding to the rotational axis of the wheel and a diameter approximately equal to the diameter of the wheel.

10. The invention as set forth in claim 9 wherein substantially all of the shock absorbers are also contained within the boundary of the imaginary cylinder.

* * * * *